June 4, 1963 D. R. ANDREWS 3,092,296

TAPE TRANSPORT MECHANISM

Filed Dec. 1, 1960 6 Sheets-Sheet 1

INVENTOR.
DALLAS R. ANDREWS
BY
Morris Rabkin
ATTORNEY

June 4, 1963 D. R. ANDREWS 3,092,296

TAPE TRANSPORT MECHANISM

Filed Dec. 1, 1960 6 Sheets-Sheet 2

INVENTOR.
DALLAS R. ANDREWS
BY
Morris A. Rabkin
Attorney

June 4, 1963 D. R. ANDREWS 3,092,296

TAPE TRANSPORT MECHANISM

Filed Dec. 1, 1960 6 Sheets-Sheet 3

INVENTOR.
DALLAS R. ANDREWS
BY Morris A. Rabkin
Attorney

June 4, 1963 D. R. ANDREWS 3,092,296

TAPE TRANSPORT MECHANISM

Filed Dec. 1, 1960 6 Sheets-Sheet 4

INVENTOR.
DALLAS R. ANDREWS
BY Morris A. Rabkin
Attorney

June 4, 1963 D. R. ANDREWS 3,092,296

TAPE TRANSPORT MECHANISM

Filed Dec. 1, 1960 6 Sheets-Sheet 5

INVENTOR.
DALLAS R. ANDREWS
BY Morris L. Rabkin
Attorney

TAPE TRANSPORT MECHANISM

Filed Dec. 1, 1960 6 Sheets-Sheet 6

INVENTOR.
DALLAS R. ANDREWS
BY Morris A. Rabkin
Attorney 3,092,296

TAPE TRANSPORT MECHANISM

Dallas R. Andrews, Merchantville, N.J., assignor to Radio Corporation of America, a corporation of Delaware Filed Dec. 1, 1960, Ser. No. 72,947
20 Claims. (Cl. 226—49)

This invention relates to apparatus for feeding a tape between a pair of reeling devices, and more particularly to a tape transport mechanism suitable for use in magnetic tape recording and reproduction apparatus.

The invention is particularly useful in providing apparatus for successively recording and reproducing a plurality of parallel tracks on a magnetic tape record. The invention is also useful generally in systems for feeding and reeling a web medium, such as a wire, film, tape and the like.

Tape records having a plurality of parallel tracks recorded thereon are known as multi-track records. It is often desired to record or play back a long, continuous program on some or all of the tracks. This is accomplished by transporting the tape in one direction to scan one of the tracks and then transporting the tape in the reverse direction while scanning the next successive track. Stereophonic recordings are made by recording on two tracks while the tape is transported in one direction and by recording on two other tracks while the tape is being transported in the opposite direction.

For convenience of operation, it is desirable that the direction of tape travel be reversed automatically at the end of each track. Tape transport mechanisms have been designed which automatically reverse the direction of tape travel at the end of each track. While these tape transport mechanisms operate satisfactorily, they are usually complex and expensive to manufacture. For example, known, automatically reversible tape transports have included therein somewhat complicated electromagnetic control systems for effecting reversal of tape direction when the tape is almost exhausted on the supply reel or other reeling devices.

It is an object of the present invention to provide a fully automatic tape transport mechanism which is less complicated and which may be manufactured at lower cost than any known, fully automatic, tape transport mechanism.

It is a further object of the present invention to provide an improved tape transport mechanism which includes relatively simple mechanisms for conditioning the apparatus for a sequence of tape driving operations in opposite directions.

It is a still further object of the present invention to provide an improved control mechanism for automatically initiating tape transporting operations in timed sequence.

It is a still further object of the present invention to provide, in a tape transport mechanism, an improved control mechanism for conditioning the tape transport to reverse tape drive direction.

It is a still further object of the present invention to provide improved, fully automatic tape transport apparatus using only one motor and no other electromagnetic device for obtaining tape drive in opposite directions.

Briefly described, a tape transport mechanism according to the present invention includes reeling devices and tape driving means of the type having a capstan and pressure roller which are movable into and out of tape driving relationship. A pair of linkages are provided which are positionable to maintain the tape driving means in tape driving relationship. One of these linkages can be set in position to maintain the driving means in tape driving relationship when the tape is to be driven in one direction, and the other of these linkages can be set to maintain the driving means in tape driving relationship when the tape is to be driven in the opposite direction. Tape tension responsive means are associated with these linkages for releasing the linkage which is set when the tape is almost exhausted on the reeling device supplying the tape.

A control is provided in accordance with a feature of the invention which is operated automatically when the tape driving means moves out of tape driving relationship. This control, in turn, operates a mechanism for reversing the direction of the tape drive and for resetting one of the linkages. This mechanism includes a pair of cyclically rotatable members, such as cams, which are also movable into driving relationship with the tape drive means. The cyclically rotatable members are separately linked each to a different one of the aforementioned linkages and are adapted to set their respective linkages after a cycle of rotation of the rotatable members. When either linkage is set, the tape driving means is moved into tape driving relationship and the tape tension responsive means is positioned to sense the tension in the tape.

The cyclically rotatable members are also operatively coupled to the control in accordance with a feature of the invention. Upon operation of the control, a selected one of these members moves into driving relationship with the tape driving means. After the selected, cyclically rotatable member executes a cycle of rotation, the tape driving means and the tape tension sensing means are reset and the tape transport is conditioned to drive the tape in the reverse direction. By alternately selecting different ones of the cyclically rotatable members, the tape can be driven sequentially in opposite directions.

The invention itself, both as to its organization and method of operation, as well as additional objects and advantages thereof, will become more readily apparent from the following description, when read in connection with the accompanying drawings, in which.

Figure 2:
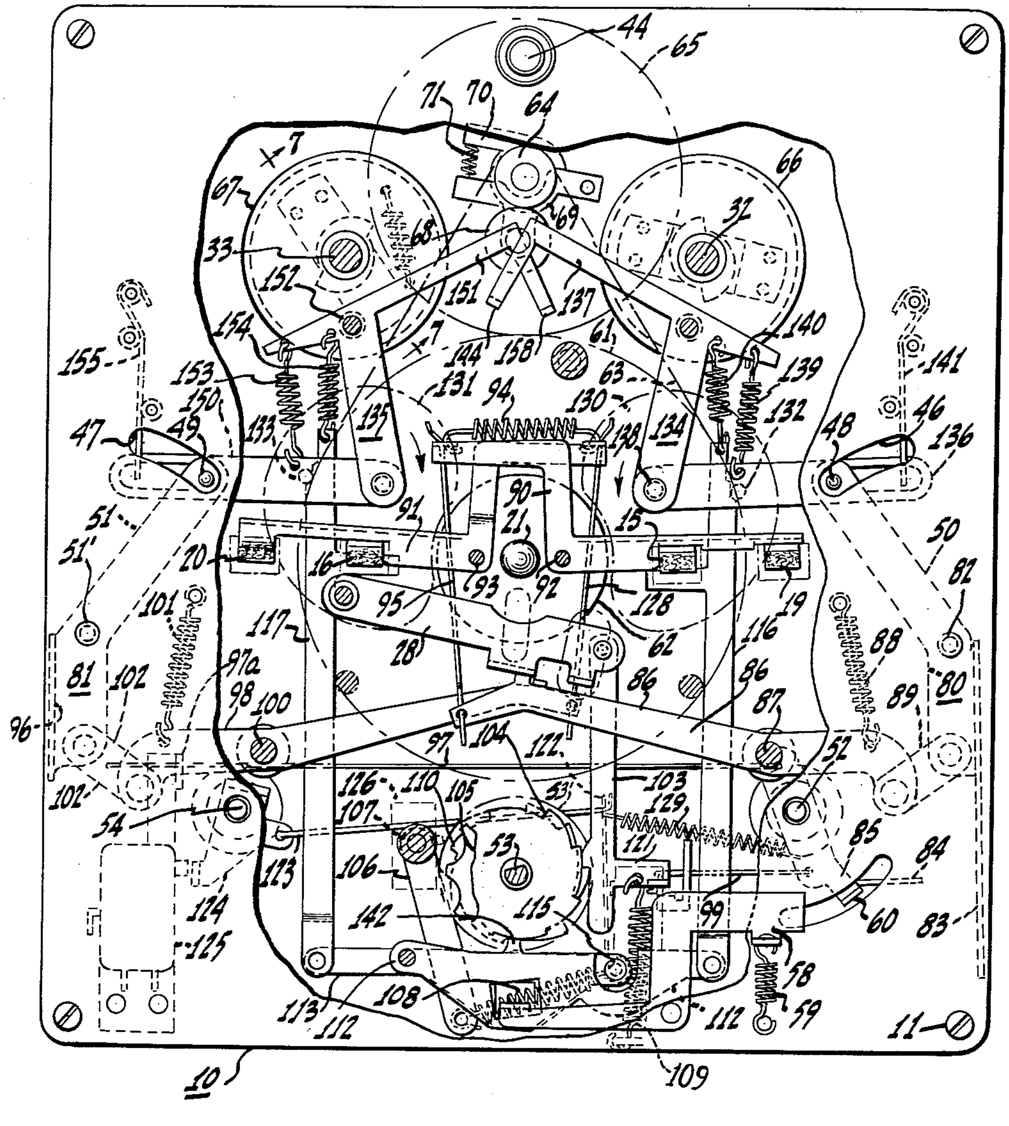
FIGURE 2 is a plan view of the mechanism illustrated in FIG. 1 in idle position and shown with part of the tape deck broken away.
Figure 6:
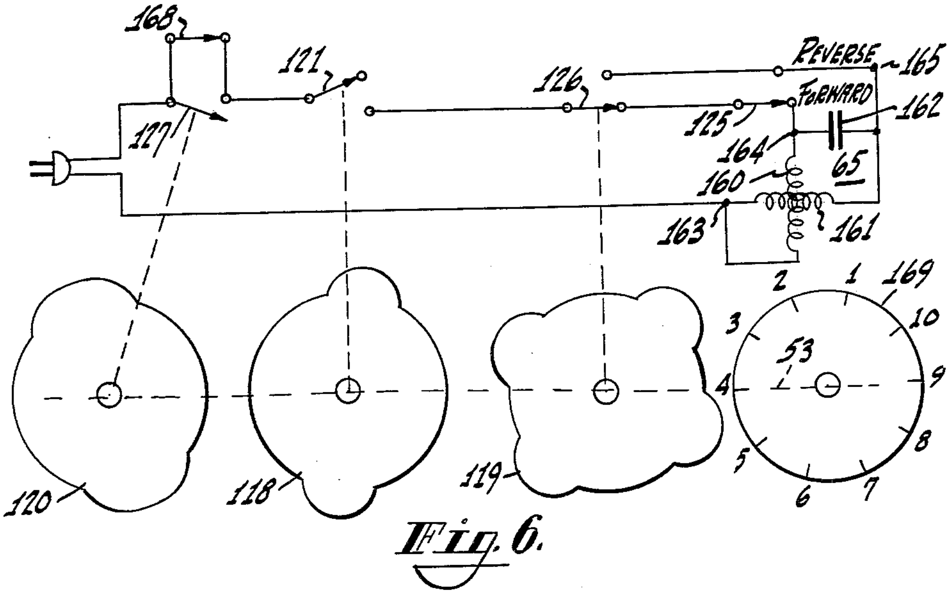
FIGURE 6 is a schematic diagram of the motor control circuit of the tape transport illustrated in the preceding figures.
Figure 6A:
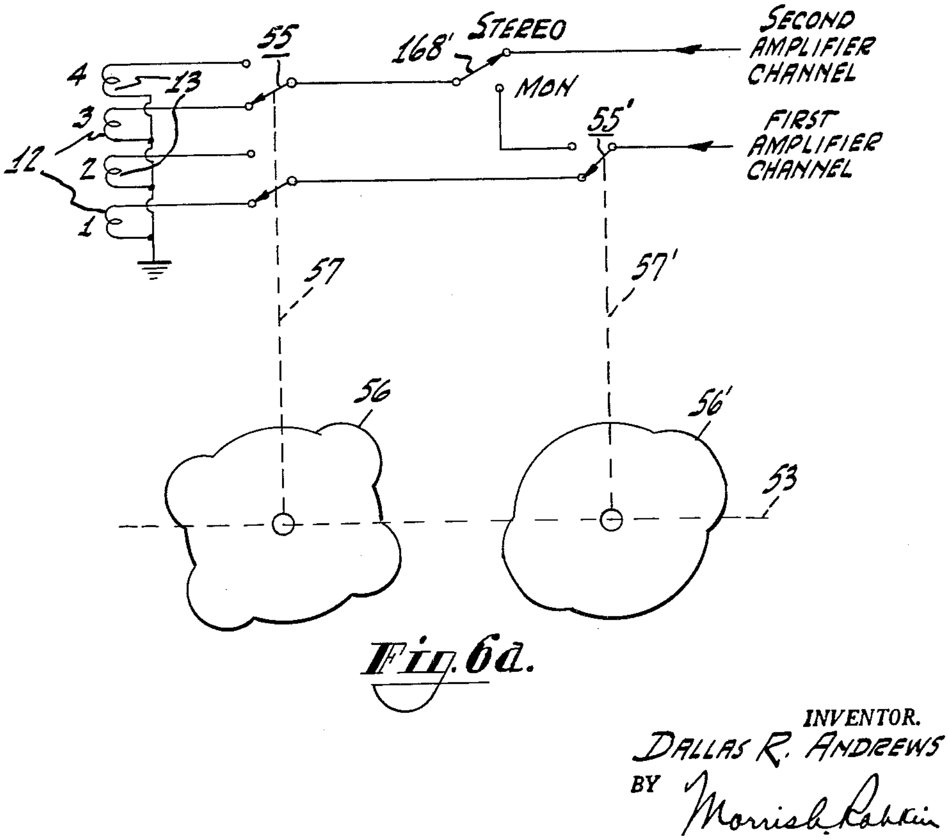
Figure 7:
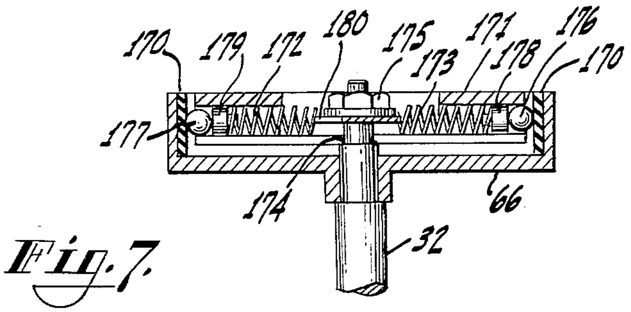
Figure 8:
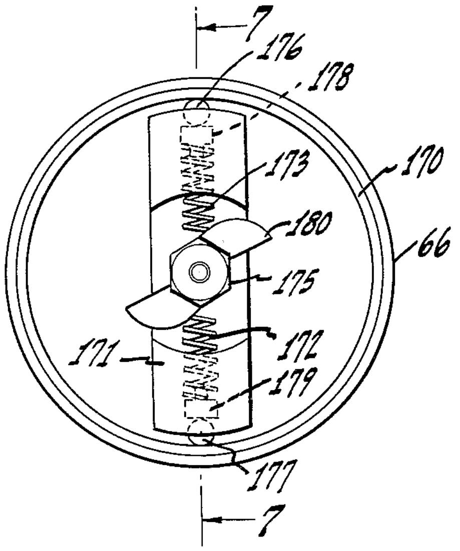

FIGURE 6*a* is a schematic diagram of the head switching circuit;

FIGURE 7 is a sectional view of the clutch mechanism illustrated in FIG. 2, the section being taken along the line 7—7 of FIG. 2; and FIGURE 8 is a bottom plan view of the clutch mechanism shown in FIG. 7.

Figure 1:
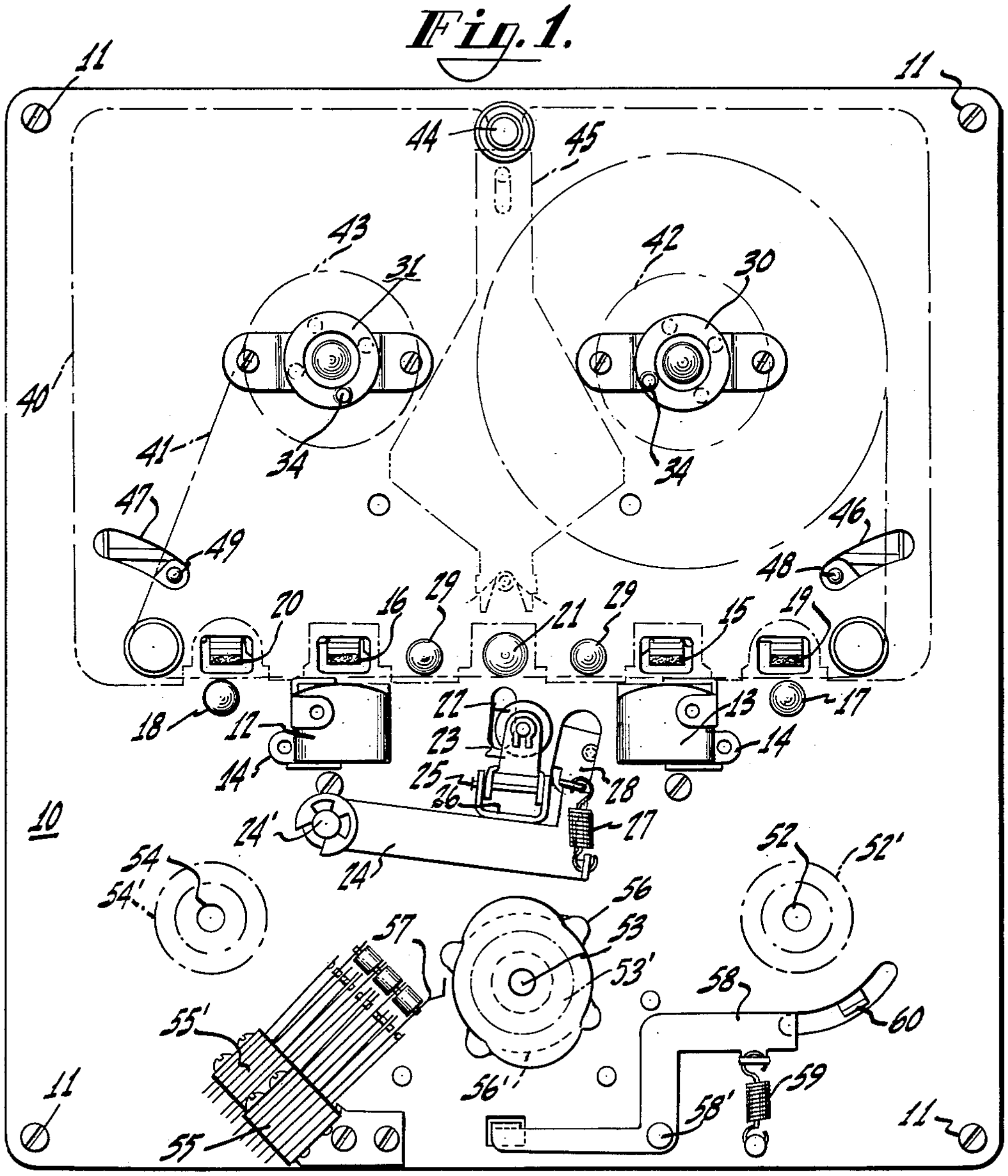
FIGURE 1 is a plan view of a magnetic tape transport mechanism in accordance with the present invention with its escutcheon removed to expose parts of the mechanism.

Referring, first, to FIG. 1 of the drawings, there is shown a tape deck 10 across which a magnetic tape 41 is adapted to travel. The component parts of the illustrated tape transport mechanism are mounted on the tape deck 10 or between the tape deck and another plate (not shown)

which is disposed below the deck and attached thereto by four bolts 11. A pair of magnetic heads 12 and 13 are mounted on the tape deck 10 on one side of the tape path by means of brackets 14. These heads cooperate with pressure pads 15 and 16 on the opposite side of the tape path. Tape guides 17 and 18 are mounted adjacent the heads 12 and 13 on the same side of the tape path as are the heads. Pressure pads 19 and 20, on the opposite side of the tape path, cooperate with the guides 17 and 18 for the purpose of holding the tape taut as it passes over the heads. The heads 12 and 13 are each positioned to scan different pairs of adjacent record tracks on the tape 41. The heads 12 and 13 may be playback heads which are also suitable for recording. In the event that facilities for erasing the tape are desired, an additional pair of erase heads may be provided in place of the guides 17 and 18.

Also mounted on the tape deck 10 is a capstan 21 which extends through the tape deck 10 on the aforementioned opposite side of the tape path and cooperates with a pressure roller 22. Another pair of guides 29 extend from the tape deck 10 from opposite sides of the capstan 21 along a line parallel to the tape path.

The pressure roller 22 is mounted on a bracket 23. The bracket 23 is pivotally mounted on an arm 24 by means of pin 25 which couples the bracket 23 to a U-shaped bracket 26. The bracket 26 is fastened to the arm 24 which is yieldably coupled, by means of a spring 27, to another arm 28, better shown in FIG. 2. The arm 24 and the arm 28 are both pivotally mounted on the tape deck 10 at pivots 24' and 28' (FIG. 2), respectively. The arm 28 and the pressure roller arm 24, which is linked thereto by the spring 27, are biased in a clockwise direction by a spring 109 (FIG. 2). The spring 109 is connected to the arm 28 by way of a pawl 103, the purpose of which is to actuate the program control when the pressure roller 22 is released and moves downwardly as viewed in FIG. 1. The pressure roller 22 is thus movably biased away from the capstan 21 (downwardly in FIG. 1) to facilitate loading of the cartridge 40 on the deck 10.

A pair of turntables 30 and 31 (FIG. 1) are secured to shafts 32 and 33 (FIG. 2) which are journaled in the tape deck 10 and in the plate (not shown) which is spaced below the deck. The turntables 30 and 31 have pins 34 (FIG. 1) extending therethrough. These pins are secured to the underside of the turntables by means of leaf springs (not shown). A magnetic tape cartridge 40 is shown, in phantom, mounted on the tape deck 10. This cartridge is of a type which is now generally available and may be purchased at many record shops with either blank (i.e., unrecorded) tape or with tape having pre-recorded programs thereon. The magnetic tape 41 is wound around hubs 42 and 43 which are rotatably mounted in the top and bottom walls of the cartridge. The hubs 42 and 43 rest upon the turntables 30 and 31. The pins 34 enter cooperating holes in the hubs 42 and 43 so as to directly couple the hubs to the turntables. The cartridge 40 has a notch therein in which a cylindrical stud 44 which projects upwardly from the tape deck is inserted when the cartridge 40 is placed on the deck 10. This stud 44 releases a brake plate 45 which normally is biased into engagement with the hubs and prevents them from rotating except when the cartridge is placed on the tape transport.

The cartridge and the tape deck 10 have openings 46 and 47 therein through which pins 48 and 49, respectively, extend. These pins 48 and 49 are movable towards the right and towards the left, respectively, from the positions shown in FIGS. 1 and 2 into engagement with the tape for the purpose of sensing the tension therein. The pins are carried, respectively, by lever arms 50 and 51 (FIG. 2) which will be described in detail hereinafter.

Three controls including shafts 52, 53 and 54 extend through the tape deck 10. Knobs 52', 53' and 54', shown in phantom in FIG. 1, are mounted on the ends of the shafts. The shaft 54, when turned clockwise, selects fast reverse operation of the transport, and, when turned counter-clockwise, selects fast forward operation of the transport. The shaft 53 is associated with a program control of the tape transport and may be turned to select the track which is to be scanned by the magnetic heads 12 and 13 and the direction of the tape travel. An electric motor which mechanically powers the mechanism can be turned on and off by rotating the shaft 53 to different positions. The shaft 52 is part of a stop-and-resume control. When it is turned in the clockwise direction, as viewed in FIG. 1, a cycle of operation of the control mechanism of the tape transport is initiated so that the direction of tape travel is reversed and the next successive track is scanned. When the shaft 52 is turned in a counter-clockwise direction, tape transport operations are stopped.

A crank 58, which forms part of the stop-and-resume control, is pivotally mounted on the tape deck 10. This crank 58 is biased in a clockwise direction about a pivot 58', as viewed in FIG. 1, by means of a spring 59 and can be rotated against this bias by an upwardly projecting end 60 of an arm 85 (FIG. 2) which is attached to the shaft 52.

Vertically stacked switches 55 and 55' having a plurality of contacts are actuated by cams 56 and 56' which are mounted on the shaft 53. The actuating bars 57 (only one of which appears in FIG. 1) of the switches function as cam followers. The switches 55 connect the heads 12 and 13 to amplifiers which may be associated with the tape transport mechanism in a manner such that the heads 12 or 13 are alternately connected to the input of the amplifier upon successive stepwise rotations of the cams 56 and 56'. The switching system will be explained in greater detail hereinafter with reference to FIG. 6*a*. Since the amplifier does not form part of the present invention, it will not be described in detail herein. Such amplifiers are, however, known in the art.

The tape drive means of the illustrated tape transport includes a capstan drive mechanism which is best shown in FIG. 2. The capstan 21 is formed by the end of a shaft which carries a capstan flywheel 61. A wheel 62 is mounted on the capstan shaft on top of the capstan flywheel 61. This wheel 62 may be made of resilient material, such as moderately hard rubber. The capstan flywheel is driven by an endless belt 63. This belt may be a rubber O-ring. The belt is positioned around a pulley 64 mounted on the shaft of a motor 65. This motor is the source of driving power for the tape transport.

The motor 65 also serves to drive the turntables 30 and 31 of FIG. 1. A wheel 66 (FIG. 2) is mounted on the shaft 32 which carries the turntable 30. Another wheel 67 is mounted on the shaft 33 which carries the turntable 31. These wheels 66 and 67 are coupled to the shafts 32 and 33, respectively, by means of clutch mechanisms. These clutch mechanisms serve to limit the torque which can be transferred to the turntables. Since the torque is limited by the clutch mechanisms, the tape can not be snapped. Any known clutch, such as a spring clutch, may be used. A preferred form of clutch mechanism is shown in FIGS. 7 and 8 and will be described hereinafter.

One wheel (66) is driven in a counter-clockwise direction when the tape is fed from left to right, as viewed in FIGS. 1 and 2 of the drawings, and the other wheel (67) is driven in a clockwise direction when the tape is fed from right to left.

Figure 3:
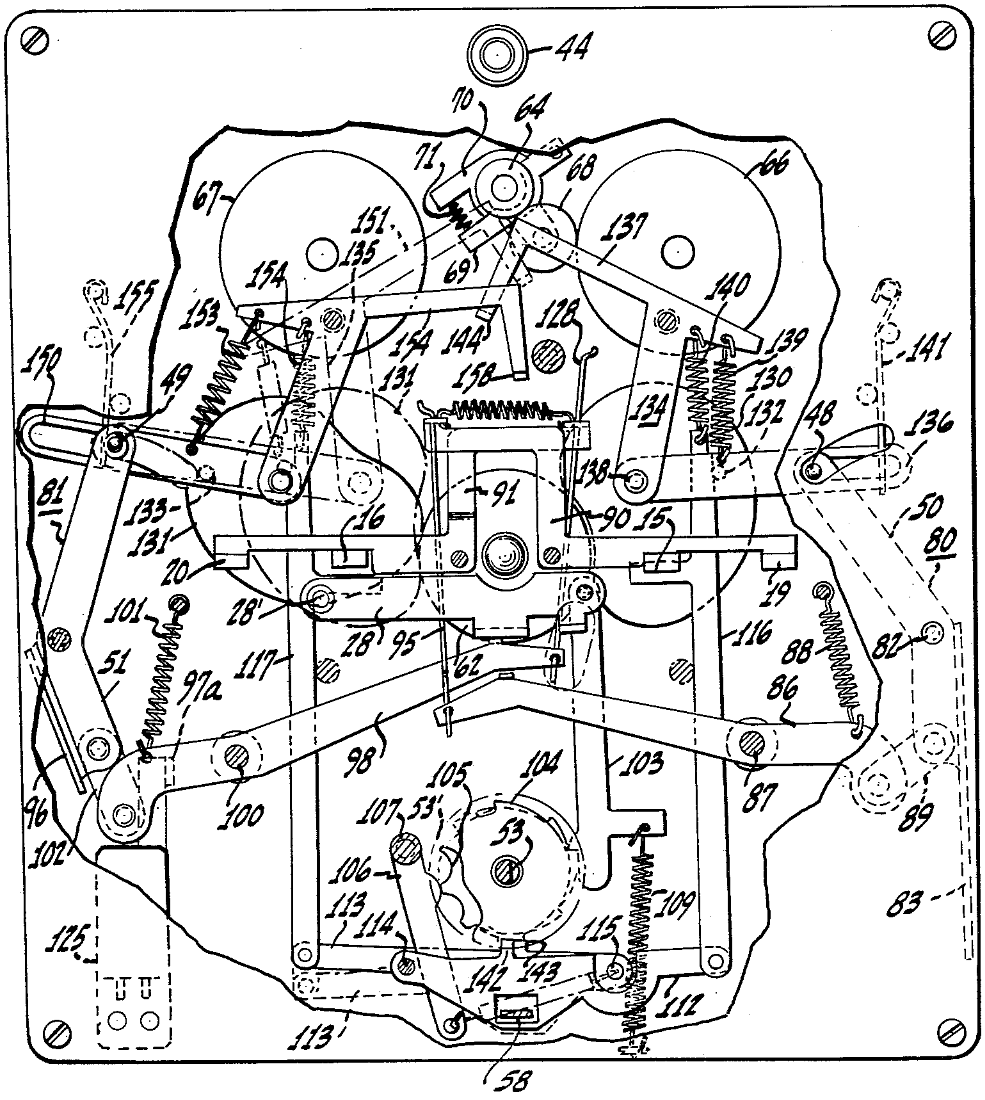
FIGURE 3 is a plan view similar to FIG. 2 showing the mechanism in a different operating position, certain of the parts being omitted for the sake of clarity.

In order to obtain these reverse direction tape drives, an idler roller 68 is mounted on an arm 69 which is pivotally mounted on a ring 70 below the pulley 64. The ring 70 is rotatably mounted on the motor shaft. This ring 70 has substantially diametrically opposed projections extending therefrom. The arm 69 is pivotally mounted on one of these projections at one end thereof and is connected by a spring 71 to the other of these projections. The spring 71 biases the idler roller 68 into frictional engagement with the motor pulley 64, as seen in FIG. 2. When the motor turns in a clockwise direction, as viewed in FIG. 2, the arm 69 rotates in a clockwise direction, with the ring 70 about the axis of the pulley 64, since the pulley rotates the idler roller 68 and drives it toward the wheel 66. Thus, the idler roller 68 moves and becomes wedged between the wheel 67 on the turntable shaft 33 and the motor pulley 64 and couples them in driving relationship. Similarly, when the motor 65 turns in a counter-clockwise direction, the arm 69 is frictionally driven by the pulley 64 and rotates about the axis of the pulley 64 in a counter-clockwise direction, since the roller 68 is driven by the motor pulley 64. In the latter case, the roller 68 is moved up between the wheel 66 and the motor pulley 64, as shown in FIG. 3 so that the wheel 66 is driven. It will be observed that the reversal of tape drive directions is accomplished by a simple mechanism by the mere reversal of rotation of the motor without the need for any manually operated mechanism. The idler roller 68 shifts its position automatically when the direction of motor rotation is reversed.

Automatic apparatus is provided for reversing the direction of tape travel when the tape is almost exhausted on the one of the hubs 42 and 43 of FIG. 1 which is supplying tape. This mechanism includes a pair of linkages 80 and 81 (FIG. 2) which are moved in response to the tension in the tape and which form detent or latching mechanisms which maintain the capstan 21 and the pressure roller 22 (FIG. 1) in tape driving relationship. The linkage 80 (FIG. 2) includes the lever arm 50 which carries the tape tension sensing pin 48 at the free end thereof. This lever arm 50 is pivotally mounted under the tape deck at a pivot 82. The opposite end of the lever arm 50 has a tail 83 which extends downwardly as viewed in FIGS. 2 and 3. This tail 83 is disposed to be engaged by an extension 84 (FIG. 2) on an arm 85 which is rotated by the shaft 52 of the stop-and-resume control.

The linkage 80 includes another lever 86 which is mounted on the tape deck 10 at a pivot 87. This lever 86 is biased in a counter-clockwise direction, as viewed in FIGS. 1 and 2, by means of a spring 88. The lever 86 and the arm 50 are connected by a toggle link 89. The toggle link 89 and the lever 50 form a toggle joint. When the lever 50 rotates in a clockwise direction, the bias of the spring 88 is overcome and the toggle joint moves past its dead center position. The detent mechanism provided by the linkage 80 is then set or latched.

The lever 86 also engages the arm 28 which is coupled to the pressure roller arm 24 by means of the spring 27 (FIG. 1). When linkage 80 is set, the lever 86 rotates in a clockwise direction and the arm 28 will move upwardly, as vewed in FIGS. 1 to 3, inclusive. The pressure roller arm 24 follows tthe arm 28 and carries the pressure roller 22 into contact with the capstan 21. Thus, the capstan 21 and the pressure roller 22 will be in tape driving relationship, since the tape 41 is pinched therebetween.

The pressure pads 15 and 19 are mounted on a crank 90. The other pressure pads 16 and 20 are similarly mounted on a crank 91. These cranks 90 and 91 are mounted on the deck 10 at pivots 92 and 93, respectively. A spring 94, which connects the upper ends of the cranks 90 and 91, biases the cranks 90 and 91 into positions such that the pressure pads 15, 16, 19 and 20 normally engage the heads and the guides with which they respectively cooperate. A rod 95 is connected between an end of the crank 90 and an end of the lever 86 in the linkage 80. This rod 95 restricts the movement of the crank 90 under the bias of the spring 94 when the linkage 80 is in the position shown in FIG. 2 so as to maintain the pressure pads 15 and 19 out of engagement with the tape. The rod 95 is capable of restricting the movement of the crank 90, since the ends of the rod are bent after passing through a hole in a tab which projects from the crank 90 and a hole in the lever 86.

The other linkage 81 includes the lever arm 51. This lever arm 51 has an abbreviated tail 96. The tail 96 may engage a rod 97 which is guided by a guide 97*a* and which is connected to an arm 85 (FIG. 2).

The linkage 81 also includes a lever 98 which is similar to the lever 86 and which is pivoted on the tape deck at a pivot 100. The lever 98 is biased in a clockwise direction by means of a spring 101 to the position shown in FIG. 2. A toggle link 102 is connected between the lever arms 51 and 98. This toggle link and the arm 51 form a toggle joint. When the linkage is set by movement of the toggle joint slightly past its dead center position, the linkage 81 assumes the position thereof shown in FIG. 3. In this position, the tension sensing pin 49 engages the tape adjacent the hub 43 (FIG. 1) and the arm 28 is pivoted in a counter-clockwise direction. The pressure roller 22 then moves into tape driving relationship against the capstan 21.

The end of the lever arm 98 is connected to the crank 91 by means of a rod 128. This rod 128 restricts the movement of the crank 91 under the bias of the spring 94 when the linkage 81 is in the position shown in FIG. 2, since the ends of the rod 128 are bent after they extend through a hole in a tab which projects from the crank 91 and a hole in the lever 98. When the linkage 81 is in set position, the pressure pads 16 and 20 are in contact with the head 12 and guide 18, respectively. The linkages 80 and 81 thus control the movement of the pressure pads and allow either the pressure pads 15 and 19 carried on one crank 90 or pressure pads 16 and 20 carried on the other crank 91 to engage the tape.

The arm 28 is linked to a pawl 103 which is spring biased downwardly, as viewed in FIG. 2, by a spring 109. This pawl 103 rotates a ratchet wheel 104 which is mounted on the shaft 53 of the program control. When the pressure roller 22 and the associated arms 24 and 28 are released by the lever 86 or 98 which hold them in tape driving relationship, the pawl 103 moves, under bias of the spring 109, into engagement with a tooth on the ratchet wheel 104. This advances the shaft 53 stepwise a predetermined portion of a revolution (in the illustrated case, about −36°, as can be observed in FIG. 5).

A rod 99 is connected between the arm 85 on the stop-and-resume control shaft 52 and the pawl 103. When the control shaft 52 is turned to maximum counter-clockwise position (stop position), the pawl 103 is pivoted in a direction away from the ratchet wheel 104. This avoids rotation of the ratchet wheel 104, when the mechanism is stopped with the stop-and-resume control.

Figure 4:
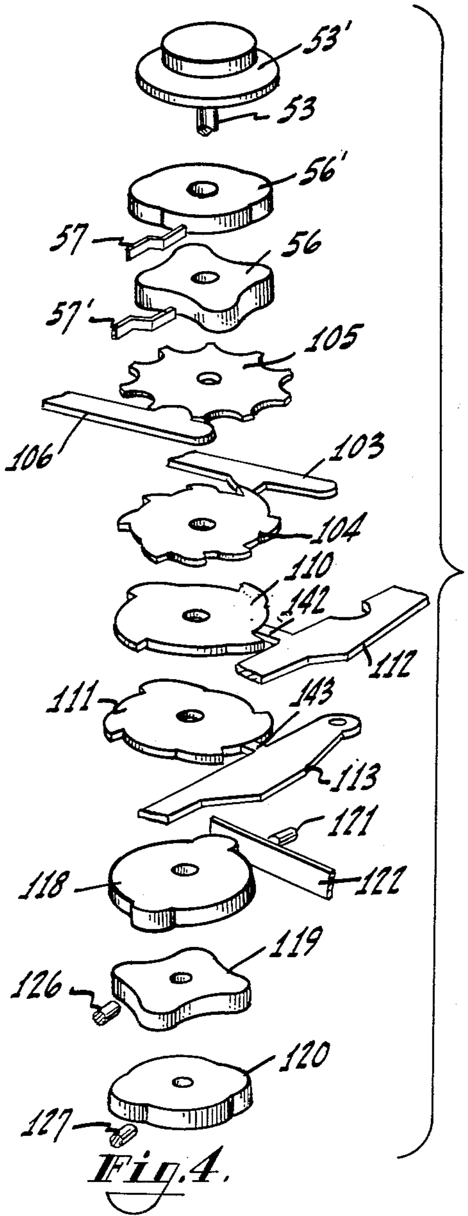
FIGURE 4 is an exploded view showing in greater detail a part of the mechanism of the tape transport illustrated in FIGS. 1 to 3, namely a control which establishes a program of tape transport operation, in one operating position thereof.
Figure 5:
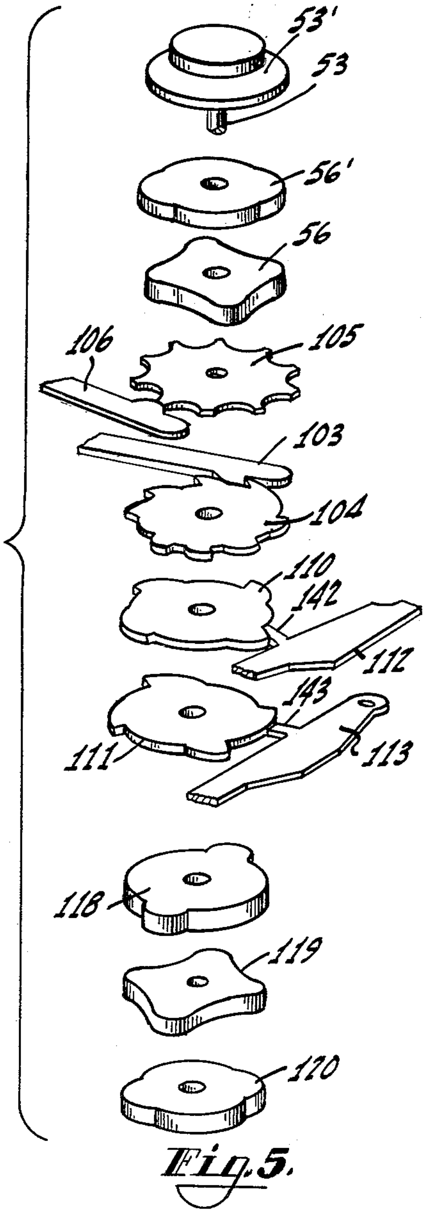
FIGURE 5 is a view similar to FIGURE 4 with the parts of the program control shown in another operating position thereof.

The shaft 53 of the program control carries a number of wheels and cams the shapes of which are best shown in FIGS. 4 and 5 of the drawings. A stop wheel 105 is disposed immediately above the ratchet wheel 104. This stop wheel 105 has ten concave, peripheral notches which cooperate with a convex protuberance on an arm 106. The arm 106 is mounted (FIGS. 2 and 3) on the tape deck 10 at a pivot 107. This arm 106 is biased in a counterclockwise direction, as viewed in FIG. 2, by means of a spring 108 which holds the arm against the stop wheel 105. The stop wheel 105 and arm 106 index the shaft 53 after each step of rotation thereof by the ratchet mechanism.

The program control also includes a pair of cams 110 and 111 (FIGS. 4 and 5) which are mounted on the shaft 53. These cams 110 and 111 cooperate with follower lever arms 112 and 113, respectively. The lever arm 112 is mounted on the tape deck at a pivot 114 (FIG. 3) and the other lever arm 113 is mounted on the tape deck at a pivot 115. A control link 116 is connected to the follower lever 112. A similar control link 117 is connected to the free end of the other follower lever arm 113. The control links 116 and 117 are biased upwardly as viewed in FIG. 2 by springs 140 and 154, respectively. These springs also bias the follower lever arms 112 and 113 so that studs 142 and 143 which project, respectively, therefrom are biased into contact with the cams 110 and 111.

The follower levers arms 112 and 113 are selectively operated by the cams 110 and 111 and serve to initiate sequences of operations which condition the mechanism for tape drive in opposite directions.

Three switch control cams 118, 119 and 120 (FIGS. 4 and 5) are mounted on the shaft 53 immediately below the control cams 110 and 111. The control cam 118 operates a switch 121 of the microswitch type by moving a spring plate 122 (FIGS. 2 and 4) which is connected to the switch 121 housing. The switch 121 is maintained in open position by a spring 129 which is connected between the arm 85 and the plate 122. This spring plate 122 is also connected by way of a rod 123 to an arm 124 which is rotated by the shaft 54 of the fast-forward-fast-reverse control. The arm 124 controls another switch 125 which controls the reversal of the motor 65. The switch control cams 119 and 120 (FIGS. 4 and 5) operate different switches 126 and 127, respectively (FIGS. 2, 4 and 6), for the purpose of reversing the direction of rotation of the motor 65 and stopping the motor. The circuit for energizing and reversing the motor and which includes the switches 125, 121, 126, and 127 will be described hereinafter in connection with FIG. 6 of the drawings.

The mechanism which controls the operation of the tape transport also includes (FIG. 2) cyclically rotatable members which are illustrated as a pair of cams 130 and 131. These cams are selectively driven by the same means which drives the tape (i.e., the motor 65, pulley 64, belt 63, flywheel 61, etc.). The cams 130 and 131 have cam surfaces which are adapted to be disposed in driving contact with the wheel 62 on the capstan shaft. Studs 132 and 133 project upwardly from the cams 130 and 131, respectively. The cams 130 and 131 are normally maintained out of driving relationship with the wheel 62 by the studs 132 and 133. The studs engage shoulders near the upper ends of the control links 116 and 117. The cams 130 and 131 may, however, be rotated only in the counter-clockwise and clockwise directions, respectively, by the wheel 62 since each of them 130 and 131 is disposed beyond the angle of traction for rotation in clockwise and counter-clockwise directions, respectively.

The cams 130 and 131 are rotatably mounted on separate linkages 134 and 135, respectively. The linkage 134 includes a slotted link 136 which is linked with an end of a bell crank lever 137 at a pivot 138. The lever 137 has an ear 144 at the free end thereof. The cam 130 is journaled on this pivot 138. The lever 137 and the link 136 are biased toward each other to the position shown in FIG. 2 by a spring 139 under tension. The control link 116 is also biased upwardly as viewed in FIGS. 2 and 3 by means of spring 140. Thus, the control link 116 is biased in a position where the shoulder thereon engages the stud 132 and holds the cam 130 out of contact with the wheel 62.

The pin 48 on the lever 50 is slidably received in the slot in the link 136 and thus couples the linkages 80 and 134 together. The pin 48 extends downwardly in a direction axially thereof through the slot in the link 136. A retaining washer larger than the width of the slot in the link 136 may be secured to the end of the pin 48 below the link 136, the pin 48 being free to move within the slot. However, when the lever 137 of the linkage 134 pivots in a counter-clockwise direction, such pivotal movement being caused by the rotation of the cam 130, as will be explained hereinafter, the pin 48 will be engaged by the link 136 at the end of the slot therein, and the pin 48 will be moved towards the right, as viewed in FIG. 2.

The lever 50 moves with the pin 48 and pivots in a clockwise direction about its pivot 82, thereby moving the toggle joint formed by the toggle link 89 past dead center so that the lever 50 also pivots the lever 86. The lever 86, in turn, pivots the arm 28 and therefore positions the pressure roller 22 in tape driving relationship with the capstan 21 and the linkage 80 is in latched position, as explained above. The linkage 134 can return to the position shown in FIG. 2 after a cycle of rotation of the cam 130. The linkage 80, however, remains set in position to effect the driving of the tape because of the toggle link detent mechanism.

When the pin 48 is moved toward the right, it engages a somewhat cane shaped stop rod 141 of spring material. This rod 141 absorbs any overtravel of the linkage 80 when the toggle link moves past dead center. The rod 141 returns the pin 48 and the linkage 80 to a predetermined position by its spring action. When the pin 48 and the linkage 80 are in this predetermined position, the forces developed by the tension in the tape when the tape is almost emptied from the hub 42 (FIG. 1) will be sufficient to trip the toggle.

The linkage 135 includes a slotted link 150 similar to the slotted link 136. This linkage 135 also includes a bell crank lever 151 which is pivotally mounted on the deck 10 at a pivot 152. This lever is similar to the lever 137 and has an ear 158 at its free end. The link 150 and lever 151 are biased towards each other by means of a spring 153 similar to the spring 139. The spring 154 normally biases the control link 117 to a position where its shoulder engages the stud 133 on the cam 131. The control link 117 therefore holds the cam 131 out of driving relationship with the wheel 62.

The linkage 81 is coupled to the linkage 135. The tension sensing pin 49 extends through the slot in the slotted link 150. Accordingly, when the slotted link 150 moves towards the left, as viewed in FIG. 2, in response to the cam 131 by the wheel 62, the lever 51 will pivot in a counter-clockwise direction. This movement of the lever 51 positions the lever 93 so as to bring the pressure roller and capstan into driving relationship with the tape for the purpose of sensing the tension therein. This movement of the lever 51 also causes the toggle joint formed between the link 102 and the lever 51 to move past its dead center position. The linkage 81 is then set or latched in position. The linkage 81 remains latched although the link 150 returns to its initial position after a cycle of rotation of the cam 131. A somewhat cane shaped rod 155 of spring material, similar to the rod 141, acts as a yieldable stop to absorb overtravel of the linkage 81 and set the linkage in predetermined position whereby the force due to the tension in the tape just before the hub 43 (FIG. 1) is emptied will be sufficient to trip the toggle joint detent.

The switching system for supplying power to the motor 65 and which reverses the motor is shown in FIG. 6. The motor 65 is of the split-phase type and has two stator windings 160 and 161 which are connected by a capacitor 162. The motor has three terminals 163, 164 and 165. When alternating current voltages are applied between the terminals 163 and 164, the motor revolves in a forward direction to cause the tape to be reeled from left to right, as viewed in FIG. 1. The motor revolves in a reverse direction when alternating current voltages are applied between the terminals 163 and 165. In that case, the tape will be reeled from right to left, as viewed in FIG. 1.

The switches 121, 125, 126 and 127, which are operated by the cams 118, 119 and 120 and by the fast-forward-fast-reverse control, are shown as being of the S.P.D.T. type. The cams and switches are shown in the first or off position of the program control. There are effectively ten successive positions of the program control, each amounting to approximately 36° of rotation of the shaft 53. These positions may be indicated on a disc 169 which is rotatable with the shaft 53. The first of these positions is an off position and is the position indicated in FIG. 6. When the control is rotated about 36° to the second position, the apparatus is conditioned to drive the tape from left to right. The third position, about 72° from the position indicated in FIG. 6, provides tape drive in the opposite direction, or from right to left, as viewed in FIG. 1. The fourth position—108° from that shown in FIG. 6—again conditions the apparatus for reeling from left to right, as viewed in FIG. 1. The fifth position—144° from that of FIG. 6—again provides reeling from right to left. The sixth position, which is removed 180° from the first position, is another off position. When the control shaft is moved into the seventh position, tape drive from left to right is again initiated. The eighth, ninth and tenth positions effect reeling from right to left, left to right and again from right to left, respectively. When the control returns to the first position, tape drive is again terminated. The cam 120, the switch 127 and another S.P.D.T. switch 168 are for stereophonic operation of the tape transport. The switch 168 is referred to as the stereo-monaural switch. A separate control for this switch (not shown) may be mounted on the tape deck. With the switch 168 in the stereo position, the cam 120 causes the switch 127 to open when the shaft returns to the fourth position or to the ninth position. This permits two of the four record tracks on the tape to be scanned while the tape is moving from left to right and the remaining two of the record tracks to be scanned when the tape is moving from right to left in the second and third or in the seventh and eighth positions of the control.

It will be apparent, from FIG. 6, that the cams 118, 119 and 120 are formed with protrusions of such sizes and shapes as to effect opening and closing of the switches 121, 126 and 127 during each of the ten positions of the control which are indicated on the calibrated disc 169. The switch 125 operates together with the switch 121 to obtain fast-forward and fast-reverse operation. When fast-forward or fast-reverse operations are obtained, the program control should be in either of its off positions, i.e., either in position 1 or in position 6 of disc 169. For fast-reverse, the shaft 54, which controls the switch 125, is turned in a clockwise direction and operates the reversing switch 125, the rod 123 moves to the left and the spring plate 122 pivots to the left (FIG. 2) so as to cause the switch 121 to close. The blade of the switch 125 normally connects to the forward terminal 164 of the motor 65. When the shaft 54 is turned in the clockwise direction, the blade of the switch 125 is switched to the reverse terminal of the motor and the switch 121 is closed. The motor is then energized and the tape is reeled in the reverse direction (right to left in FIG. 1). Since the pressure roller and pressure pads do not contact the tape, the tape may be reeled at high speeds. For fast forward, the blade of the switch 121 is closed and connects the power line to the forward terminal of the motor through the reversing switch 125. The motor is energized and the tape is reeled in the forward direction from left to right as viewed in FIGS. 1 to 3.

The circuit for switching the heads 12 and 13 is shown in FIG. 6*a*. The head 12 includes two head units which are disposed for scanning tracks 1 and 3 when the tape is reeled from left to right as viewed in FIG. 1. The other head 13 includes two head units for scanning tracks 2 and 4. These head units are illustrated in FIG. 6*a* as coils, identified by numerals 1, 2, 3 and 4 corresponding to the tracks scanned by the respective head units. One side of each of these coils is grounded. The other side is connected to the fixed contacts of the switch 55. The movable arms of the switch 55 are connected to a switch 168' which may be part of the stereo-monaural switch 168 (FIG. 6) and to fixed contacts of the switch 55. The cams 56 and 56' which operate the switch 55 and 55', respectively, cause the heads to be connected to first and second record and play back amplifier channels. The second record-play back amplifier channel is connected only when stereophonic operation is selected. For stereophonic operation, the heads 1 and 3 are connected simultaneously to the first and second record-play back amplifier channels, respectively, on every other position of the program control 53. The head units 2 and 4 are simultaneously connected to the first and second amplifier channels, alternatively with the head units which scan tracks 1 and 3.

During monaural operation, the head units 1, 2, 3 and 4 will be connected sequentially to the first amplifier channel in positions 2, 3, 4 and 5 of the program control due to switching accomplished by the cams 56 and 56' (FIG. 6*a*) which operate the switches 55 and 55' through their switch actuating members 57 and 57'. The head units 1, 2, 3 and 4 are also connected sequentially to the first amplifier channel on the seventh, eighth, ninth and tenth positions of the program control.

The operation of the tape transport mechanism will become more apparent by referring, first, to FIG. 3 of the drawings. To start operations, the track selector shaft 53 is turned to select one of the tracks. Assume, for example, that the first track on the tape 41 is selected. When the shaft rotates the second control cam 111 from the position shown in FIG. 4 to the position shown in FIG. 5, the cam follower arm 113 is pivoted in a counter-clockwise direction about the pivot 115 by one of the raised portions of the cam 111, as shown in FIG. 5. The control link 117 is moved by the follower arm 113 in a downward direction, as viewed in FIG. 3. The link 117 becomes disengaged from the stud 133 and permits the cam 131 to move under the bias of the springs 153 and 154 into contact with the wheel 62 on the capstan shaft. This is the position of the cam 131 shown in phantom in FIG. 3.

The switch control cam 118 also rotates when the shaft 53 is turned and closes the switch 121. The switch 126 is also closed by the cam 119. This supplies current to the motor 65 and causes the capstan 21 and the wheel 62 to rotate in a counterclockwise direction. The cam 131 is therefore driven in a clockwise direction and executes a complete cycle of rotation until the stud 133 is caught by the shoulder of the control link 117. The stud 133 stops further rotation of the cam 131, since the cam is held away from the wheel 62. The link 117 is bent so that the stud 133 clears the link 117 except at the end of its cycle of rotation. During this cycle of rotation, the linkage 135 moves from the position shown in phantom in FIG. 3 to the position shown in full in FIG. 3 and then returns to the position shown in FIG. 2.

The link 150 moves toward the left during the latter part of the cycle of rotation of the cam 131. During this movement, the pin 49 on the link 51 of the linkage 81 is engaged by the periphery of the slot in the link 150, and it is pivoted in a counter-clockwise direction about its pivot 51' to the position thereof shown in FIG. 3. Motion is transferred from the link 51 to the lever 98 through the toggle link 102 (see FIG. 2). The lever 98 therefore turns in a counter-clockwise direction and pivots the arm 28 in a counter-clockwise direction. The arm 28 yieldably urges the pressure roller 22 (FIG. 1) through the spring 27 and the pressure roller arm 24, into contact with the capstan 21. The tape is then driven by the capstan from left to right. The toggle link 102 also moves through its dead center position to the position shown in FIG. 3 and sets or latches the linkage 81 in position.

When the motor 65 is energized for tape driving from left to right, the idler wheel 68 is moved in between the motor pulley 64 and the wheel 66 on the take-up hub shaft 32 and drives the hub 42 to take up the tape as it is fed by the capstan. At this time, the cam 56 (FIG. 1) actuates the track selector switch 55 and connects the head 12 to the amplifier so that signals recorded on the first track of the tape may be played back.

When the lever 51 of the linkage 81 rotates in a counter-clockwise direction, the tension sensing pin 49 moves to the left to the position shown in FIG. 3 and thus into contact with the tape in that portion of the tape path adjacent to the hub 43 which is then supplying tape. The tape is reeled from the hub 43 to the hub 42 until it is almost exhausted on the hub 43. The path of the tape then moves toward the right, as viewed in FIG. 1. The amount of tension in the tape increases because of the lengthening of the tape path adjacent the hub 43 and this lengthening is restricted by the pin 49. This develops a force towards the right on the pin 49, as viewed in FIGS. 1, 2 and 3. This force is sufficient to pivot the lever 51 (FIG. 3) clockwise and return the toggle link 102 past dead center, thereby tripping the toggle. The lever arm 98 therefore rotates in a clockwise direction under the bias of the spring 101. The arm 28 of the pressure roller assembly is then released, and the pressure roller 22 moves downwardly, as viewed in FIG. 1, under the bias of the spring 109 (FIG. 3) which is attached to the pawl 103. At the same time, the pawl 103, engages the ratchet wheel 104 and rotates it one step (36°) to position 2 of the program control. A raised portion of the control cam 110 then pivots the cam follower lever 112 in a clockwise direction. The control link 116 attached to the follower lever 112 is then pulled downwardly, whereupon the shoulder thereof is withdrawn below the level of the stud 132 on the cam 130. The cam 130 then moves into driving contact with the wheel 62.

The cams 118 and 119 on the shaft 53 actuate the switches 121 and 126 in sequence as the pawl 103 turns the ratchet 104 (see FIGS. 4 and 5). The connections to the motor 65 are thus reversed through the switch 126 (FIG. 6). The hub 43 is then driven to take up the tape. The direction of rotation of the capstan 21 is also reversed so that the tape may be driven from right to left.

The wheel 62 on the capstan shaft now rotates in a clockwise direction and causes the cam 130, which has been positioned in driving contact with the wheel 62, to rotate in a counter-clockwise direction about the pivot 138. Such rotation moves the link 136 in the linkage 134 towards the right. The link 50 of the linkage 80 then becomes coupled to the link 136 through the pin 48 and pivots in a clockwise direction. The motion of the link 50 transfers to the lever 86 by way of the toggle link 89. The toggle link moves past its dead center position and latches the linkage 80. The arm 28 of the pressure roller assembly is again pivoted in a counter-clockwise direction, this time by the lever 86, so as to bring the pressure roller 22 (FIG. 1) into engagement with the capstan 21. The tape is then driven from right to left.

Movement of shaft 53 also causes the cams 56 and 56′ to actuate the track selector switches 55 and 55′. This connects the head 13 to the amplifier so that the second track, which was recorded from right to left on the tape 41, can be played back.

The tension sensing pin 48 moves with the lever arm 50 towards the right, as viewed in FIG. 3, into engagement with the tape 41 adjacent the hub 42 which is now supplying the tape. When the tape is almost exhausted on the hub 42, the pin 48 senses the increased tension in the tape and trips the toggle by returning the toggle link 89 past dead center. This releases the linkage 80. Accordingly, the arm 28 of the pressure roller assembly is again released, the ratchet 104 is turned another 36° to position 3 of the program control, and the mechanism is reset for reeling from left to right upon rotation of the cam 131, as was explained heretofore. The direction of travel of the tape is thus repeatedly reversed until all four of the tracks on the tape are scanned. After the last track is scanned, the ratchet wheel 104 rotates the shaft 53 and moves the switch control cam 118 to a position where the switch 121 opens the circuit to the motor. This stops the motor. Operation of the machine can be resumed by turning the shaft 53.

The operation of the stop-and-resume control which is operated by the shaft 52 will now be considered. In order to stop tape travel, the shaft 52 is turned in a counter-clockwise direction. Either the tail 83 of the lever 50 or the tail 96 of the lever 51, respectively, will be engaged by the extension 84 (FIG. 2) of the arm 85 or the rod 97 which is coupled to the arm 85. Which of the tails 83 or 96 is engaged depends upon which of the linkages 80 and 81 is set in latched position. The latched linkage will be tripped since the extension 84 or the rod 97 will move either the toggle joint associated with the linkage 80 or the linkage 81 past its dead center position. When the linkage 80 or 81, as the case may be, is released, the pawl 103 will be maintained away from the ratchet wheel 104 by the rod 99 which is connected to the arm 85. Accordingly, the ratchet wheel 104 will not rotate even though the pawl 103 moves downwardly.

The motor 65 is stopped since the spring 129 urges the plates 112 in a direction to actuate the switch 121 to open position.

Operation can be resumed by turning the shaft 52 in a clockwise direction. The arm 85 then engages the crank 58 and turns the crank 58 in a counter-clockwise direction. An end of the crank 58 is turned downwardly through openings in the cam follower links 112 and 113. Thus, both of the cam follower links 112 and 113 are pivoted with the crank 58. The cam follower links move both cam follower arms 116 and 117 downwardly, simultaneously. The cams 130 and 131 are then released and both cams move into contact with the wheel 62. The motor 65 is energized when the arm 85 rotates in a clockwise direction, since the spring plate 122 is released. Assume, for purposes of illustration, that the tape was traveling from left to right, as viewed in FIG. 2, prior to the stop of tape travel. The wheel 62 is then rotating in a counter-clockwise direction. The cam 131 is rotated by the wheel 62 and sets the linkage 81 as explained heretofore so that reeling operations as before stopping of tape travel are resumed.

The cam 130 does not rotate since it is disposed beyond the angle of traction with the wheel 62 when the wheel 62 is rotating in a counter-clockwise direction. The ear 158 of the crank 115 engages the ear 144 on the crank 137 when the cam 131 rotates. This moves the cam 130 out of contact with the wheel 62. The pin 132 engages the shoulder of the control link 116 so that the cam 130 will remain out of contact with the wheel 62.

The coupling mechanism which couples the wheel 66 to the shaft 32 is illustrated in FIGS. 7 and 8. This coupling mechanism is described in a patent application, Serial No. 72,948, filed December 1, 1961, in the names of Dallas R. Andrews and John B. Kelly, and assigned to the same assignee as the present invention. This mechanism is in the nature of a clutch, but differs from the usual clutch in that there is continuous slippage in the mechanism during its operation. For convenience, however, it will be called a clutch herein. The clutch mechanism which couples the shaft 33 to the wheel 67 is identical so that only the clutch mechanism for the shaft 32 and wheel 66 will be described herein.

One of the most serious problems in tape reeling systems is irregular reeling action due to oscillation or vibration in the clutches which couple the reeling devices to their drive members. It has been found that such oscillation is caused by the difference between the static and the dynamic friction which produces a nonlinear traction when the clutching action is initiated and when the clutching action is terminated. This non-linearity in both the forward and backward directions of motion of the coupled members in effect provides a negative frictional resistance. This negative frictional resistance produces vibration at some frequency, depending upon the mechanical constants of the clutching system. In the illustrated clutch, this non-linearity is reduced by minimizing the difference between the static and the dynamic friction in the clutch mechanism through the use of a flowable material as a clutch facing. A flowable material is a material which can change its shape by flow and can elastically return to its original shape. This flowable material is shown as a facing sleeve 170 disposed inside the wheel 66.

The clutch mechanism also includes a bar 171 which is counter sunk and internally bored to provide passages 172 and 173 which extend longitudinally therethrough. The shaft 32 has a shoulder 174 near its upper end on which the bar 171 rests. Beyond the shoulder 174, the shaft 32 is threaded and a nut 175 holds the bar 171 fixedly on the shaft 32. Steel balls 176 and 177 are disposed in the passages 172 and 173 at the outer ends thereof. These steel balls are biased toward the facing sleeve 170 by means of spring biased slugs 178 and 179. The bias on the balls 176 and 177 is adjustable by means of a wing cam 180 which is disposed around the shaft 32 and held on the bar 171 by means of the nut 175. The bias on the balls determines the maximum amount of torque which can be transferred between the wheel 66 and the shaft 32.

The sleeve 170 is desirably made of soft rubber. However, any resilient material, such as a suitable plastic, may be used. The balls 176 and 177 normally cause the material of the sleeve to flow outwardly as the sleeve 170 rotates. The amount of flow depends upon the speed of the wheel 66 with respect to the shaft 32. It should be noted that the material of the sleeve 170 is caused to flow as distinguished from merely being compressed. The balls roll on the facing and cause flowing of the rubber. Slippage occurs since the speed of the balls is different from the speed of the facing 170. The greater the tension, the more the rubber facing 170 is caused to flow or be displaced from the vicinity of the balls 176 and 177. The rubber is always in a condition of stress. Thus, no static condition exists in the clutch even when the wheel 66 is stopped. There is always a dynamic friction coupling as contrasted with a static function coupling between the shaft 32 and the wheel 66 through the balls 176 and 177 and the sleeve 170. This dynamic friction varies linearly from stop through the speed range of the clutch.

From the foregoing description, it will be apparent there has been provided an improved tape transport mechanism which is fully automatic in operation. This tape transport mechanism is less complex than known, fully automatic tape transport mechanisms and utilizes only one motor to provide tape driving power and to perform the various automatic operations of the mechanism. While only one embodiment of a tape transport mechanism in accordance with the present invention has been described, variations thereof, as well as in components thereof coming within the scope of this invention will, no doubt, be apparent to one skilled in the art. Accordingly, it is intended that the foregoing shall be considered illustrative and not in any limiting sense.

What is claimed is:

1. In tape handling apparatus having tape drive means which is movable into and out of tape driving position, a mechanism for automatically moving said drive means into said tape driving position which comprises, in combination, a pair of rotatable means each for executing a cycle of rotation in a direction opposite to the direction of rotation of the other when actuated, and means operatively coupling said tape drive means to different ones of said pair of rotatable means for translating the rotation of said different ones of said pair of rotatable means alternately into movement of said tape drive means into said tape driving position.

2. In tape handling apparatus having tape drive means which is movable into and out of tape driving position, a mechanism for automatically moving said drive means into said tape driving position which comprises, in combination, rotatable means for executing a cycle of rotation when actuated, means operatively coupling said tape drive means to said rotatable means for translating the rotation thereof into movement of said tape drive means into said tape driving position, and an actuable detent mechanism operated by said translating means for maintaining said tape drive means in said tape driving position.

3. In tape handling apparatus having tape drive means which is movable into and out of tape driving position, a mechanism for automatically moving said tape drive means into said tape driving position which comprises, in combination, rotatable means for executing a cycle of rotation when actuated, means operatively coupling said tape drive means to said rotatable means for translating the rotation thereof into movement of said tape drive means into said tape driving position, an actuable detent mechanism operated by said translating means for maintaining said tape drive means in said tape driving position, and means responsive to the tension in the tape handled by said apparatus for actuating said detent mechanism when the tension in said tape exceeds a predetermined amount.

4. In tape handling apparatus having tape drive means movable into and out of tape drive position, a mechanism for automatically operating said tape drive means which comprises, in combination, a rotatable member, a pair of cams rotatable in opposite directions by said member, a pair of linkages each corresponding to a different one of said pair of cams and individually operatively coupling said pair of cams to said tape drive means for translating the rotation of said cams separately into movement of said tape drive means into said tape driving position, and control means for alternately actuating said cams for rotation by said member.

5. In tape handling apparatus having tape drive means movable into and out of tape driving position, a mechanism for automatically operating said tape drive means which comprises, in combination, a rotatable member, a cam rotatable by said member, a linkage operatively coupling said cam to said tape drive means for translating the rotation of said cam into movement of said tape drive means into said tape driving position, and a toggle link in said linkage which defines a toggle joint which is set when said tape drive means moves into said tape driving relationship to maintain said tape drive means in said tape driving position.

6. In tape handling apparatus having tape drive means movable into and out of tape driving position, a mechanism for automatically operating said tape drive means which comprises, in combination, a rotatable member, a cam rotatable by said member, a linkage operatively coupling said cam to said tape drive means for translating the rotation of said cam into movement of said tape drive means into said tape driving position, a toggle link in said linkage which defines a toggle joint which is set when said tape drive means moves into said tape driving position to maintain said tape drive means in said tape driving position, and a member coupled to said linkage and engaged with tape handled in said apparatus for moving said linkage in response to the tension in the tape whereby to trip said toggle joint when the tension in the tape exceeds a predetermined amount.

7. In tape handling apparatus having a rotatable capstan and a pressure roller which is movable into and out of engagement with said capstan for driving a tape, a mechanism for automatically operating said pressure roller which comprises a wheel rotatable with said capstan, a link having a slot therein, a cam carried by said link movable into frictional driving engagement with said wheel for displacing said slotted link during a cycle of rotation of said cam, a linkage operatively coupled to said pressure roller for moving said pressure roller into position to engage said capstan, and a pin extending from said linkage through said slot in said link for engaging said link when said link is displaced during a cycle of rotation of said cam to displace said linkage in a direction to move said pressure roller into said position to engage said capstan, said linkage including a toggle link which is set when said linkage is displaced to maintain said link in displaced position and said pressure roller in engagement with said capstan, said pin extending into engagement with the tape handled by said apparatus and being movable in response to tension in the tape exceeding a predetermined amount to trip said toggle link whereby to permit said pressure roller and said capstan to move out of its said capstan engaging position.

8. In a tape transport including tape drive means for driving a tape in opposite directions, which driving means includes an element movable into and out of tape driving relationship, a mechanism for automatically operating said drive means which comprises first and second means each individually cyclically rotatable in a direction opposite from the other, first and second motion translating means each operatively coupled to a different one of said first and second cyclically rotatable means and to said tape drive means for transferring the respective rotational motions of said first and second cyclically rotatable means into movement of said drive means element into tape driving relationship, and first and second means respectively responsive to the tension in the tape when driven in one direction and when driven in an opposite direction, said first and second tension responsive means being individually coupled to said first and second translating means, respectively, said movement of said tension responsive means in response to tension in the tape exceeding a predetermined amount being translatable by said translating means into movement of said tape drive means out of tape driving relationship.

9. In a tape transport including a capstan and a pressure roller which is movable into engagement with said capstan for driving the tape, apparatus for automatically operating said pressure roller which comprises a wheel rotatable with said capstan, means for rotating said capstan in opposite directions whereby to drive the tape in opposite directions, a first cam disposed for cyclic rotation by said wheel when said wheel rotates in one direction, a second cam disposed for cyclic rotation by said wheel when said wheel rotates in the opposite direction, a first link operatively coupling said first cam to said pressure roller for translating the motion of said cam during a cycle of rotation thereof into movement of said pressure roller into engagement with said capstan, a second link operatively coupled to said second cam and to said pressure roller for translating the motion of said cam into movement of said pressure roller into engagement with said capstan, a tape tension responsive pin carried by said first linkage and disposed to contact said tape when said tape is driven in said first direction for causing translation of said linkage in a direction to move said pressure roller away from said capstan, and a second tape tension responsive pin carried by said second linkage and disposed to contact said tape when said tape is driven in said opposite direction for causing translation of said second linkage in a direction to move said pressure roller away from said capstan.

10. In tape handling apparatus having tape drive means movable into and out of tape driving relationship, a control mechanism which comprises means for selecting a plurality of tape handling functions of said apparatus and having a sequence of operating positions each corresponding to a different one of said functions, and mechanical means coupling said selecting means and said tape drive means for advancing said selecting means between successive ones of said positions when said tape drive means moves out of tape driving relationship.

11. In a tape transport having tape drive means movable into and out of tape driving relationship, a control mechanism for conditioning said tape transport to perform a plurality of operating functions which comprises selectively operable control means for moving said drive means into tape driving relationship, a rotatable control member having a plurality of positions operatively coupled to said control means, and mechanical means coupling said tape drive means to said control member for rotating said control member between successive ones of said positions thereof when said tape drive means moves out of tape driving relationship.

12. The invention as set forth in claim 11 wherein said control mechanism includes a ratchet wheel rotatable with said control member, said ratchet wheel having a plurality of teeth each corresponding to a different one of said positions of said control member, and wherein said mechanical means includes a pawl engageable with said teeth, said pawl being coupled to said drive means and movable therewith.

13. In a tape transport having rotatable tape drive means including a drive element movable into and out of tape driving relationship and a reversible motor for rotating said tape drive means to effect tape drive in opposite directions, a control system which comprises a motor control circuit including a plurality of switches for energizing and reversing said motor, selectively operable control means for moving said drive element into tape driving relationship when said tape is driven in either one or the other of said opposite directions, a shaft, a plurality of cam members mounted on said shaft for selectively operating said switches and said control means as said shaft rotates between a plurality of positions, and mechanical means for providing coupling between said shaft and said drive element for advancing said shaft between successive ones of said positions when and only when said drive means moves out of tape driving relationship.

14. The invention as set forth in claim 13 including means operatively coupled to said drive element for moving said drive element out of tape driving relationship before the end of the tape reaches said drive element when the tape is driven in either one or the other of said opposite directions.

15. Tape transport apparatus which comprises tape driving means including means movable into and out of driving relationship with said tape, a linkage movable into and out of position for maintaining said driving means in said tape driving relationship, tape tension sensing means operatively connected to said linkage and movable into engagement with said tape for sensing the tension therein when said linkage is moved into said position, said tension sensing means moving said linkage out of said position in response to greater than a predetermined amount of tension in said tape, a cyclically rotatable member having a cam surface movable into and out of driving relationship with said tape driving means, another linkage operatively connected to said cyclically rotatable member and with said first-named linkage for moving said first-named linkage into said position after a cycle of rotation thereof, a shaft, means for rotating said shaft when said driving means moves out of said tape driving relationship, and control means rotatable with said shaft and operatively coupled to said cyclically rotatable member for selectively causing said cyclically rotatable member to move into driving relationship with said tape driving means.

16. Tape transport apparatus which comprises rotatable tape driving means including a drive element normally disposed out of tape driving relationship with the tape and movable into tape driving relationship with the tape, a first linkage movable into a position for maintaining said drive element in said tape driving relationship, means operated by said first linkage for latching said first linkage in said position upon movement of said first linkage into said position, means operatively coupled to said first linkage for sensing the tension in the tape and movable into engagement with the tape when said first linkage moves into said position, a second linkage operatively coupled to said first linkage for moving said first linkage to said position, cyclically rotatable means for moving said second linkage during a cycle of rotation of said cyclically rotatable means whereby said first linkage is moved into said position, a shaft, means for rotating said shaft when said drive element moves out of said tape driving relationship, and means operated by said shaft for coupling said cyclically rotatable means and said driving means into driving relationship upon rotation of said shaft.

17. Tape transport apparatus which comprises rotatable tape driving means normally disposed out of tape driving relationship with the tape and movable into tape driving relationship with the tape, a first linkage movable into a position for maintaining said driving means in said tape driving relationship, means operated by said first linkage for latching said first linkage in said position, means operatively coupled to said first linkage for sensing the tension in the tape driven by said driving means and movable into engagement with the tape when said first linkage moves into said position, said tension sensing means being operative to release said latching means so that said first linkage moves out of said position when the tension in the tape exceeds a predetermined amount whereby said driving means can move out of said tape driving relationship, a shaft, means for rotating said shaft when said tape driving means moves out of said tape driving relationship, a second linkage operatively coupled to said first linkage and movable to move said first linkage to said position, cyclically rotatable means for moving said second linkage whereby to move said first linkage to said position, a rotatable drive member for rotating said tape driving means and said cyclically rotating means, and means operated by said shaft for coupling said cyclically rotatable means and said drive member in driving relationship for causing a cycle of rotation of said cyclically rotatable means upon rotation of said shaft.

18. Tape transport apparatus which comprises rotatable tape driving means movable into and out of tape driving relationship with the tape, a shaft, means operatively coupling said shaft to said tape driving means for transferring the motion of said driving means when said driving means moves out of said tape driving relationship into rotation of said shaft, means for sensing the tension in the tape, a first linkage operatively coupled to said sensing means and movable into a position to bring said sensing means into engagement with the tape and to bring said tape driving means into said tape driving relationship, latching means included in said first linkage for latching said first linkage in said position, said sensing means causing said latching means to release when the tension in the tape exceeds a predetermined amount so that said tape driving means moves out of said tape driving relationship and causes rotation of said shaft, a second linkage operatively coupled to said first linkage for moving said first linkage into said position, means for rotating said tape driving means, a cyclically rotatable member selectively movable into driving relationship with said rotating means, said second linkage being operatively coupled to said member for movement therewith during a cycle of rotation of said member whereby to move said first linkage into said position, and means operatively coupling said shaft to said member for moving said member into driving relationship with said rotating means upon rotation of said shaft.

19. Tape transport apparatus which comprises tape driving means movable into and out of tape driving relationship with the tape, a pair of linkages each movable into position for maintaining said tape driving means in said tape driving relationship and movable out of said position for releasing said driving means from said tape driving relationship, a pair of cyclically rotatable means selectively movable into driving relationship with said tape driving means, said pair of linkages each being linked with a different one of said cyclically rotatable means for movement with said cyclically rotatable means into said position, means for sensing the tension in said tape operatively coupled to each of said pair of linkages for independently causing movement of said linkages out of said position whereby said tape driving means moves out of said tape driving relationship, a shaft, means for rotating said shaft when said tape driving means moves out of said tape driving relationship, and means operatively coupling said shaft and said cyclically rotatable means for selectively causing said one or the other of said pair of cyclically rotatable means to move into driving relationship with said tape driving means upon rotation of said shaft.

20. The invention as set forth in claim 19 including a reversible motor for rotating said tape driving means, and means for reversing the direction of rotation of said motor upon rotation of said shaft.

References Cited in the file of this patent

UNITED STATES PATENTS

| | | |
|---|---|---|
| 2,086,130 | Hickman et al. | July 6, 1937 |
| 2,430,538 | Somers | Nov. 11, 1947 |
| 2,741,439 | Dale et al. | Apr. 10, 1956 |
| 2,813,686 | Schroter | Nov. 19, 1957 |